Nov. 14, 1939.  C. F. CLEMENTS  2,179,543
DRUM BRAKE
Filed June 10, 1939  5 Sheets-Sheet 1

Inventor
Clarence F. Clements
By Lyon & Lyon
Attorneys

Nov. 14, 1939.   C. F. CLEMENTS   2,179,543
DRUM BRAKE
Filed June 10, 1939   5 Sheets-Sheet 2
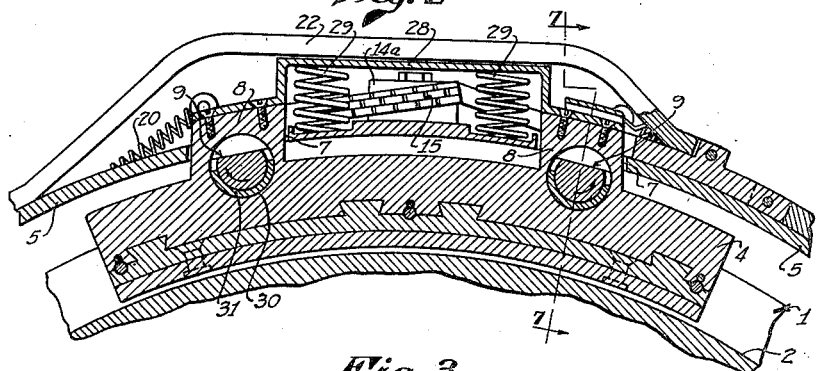
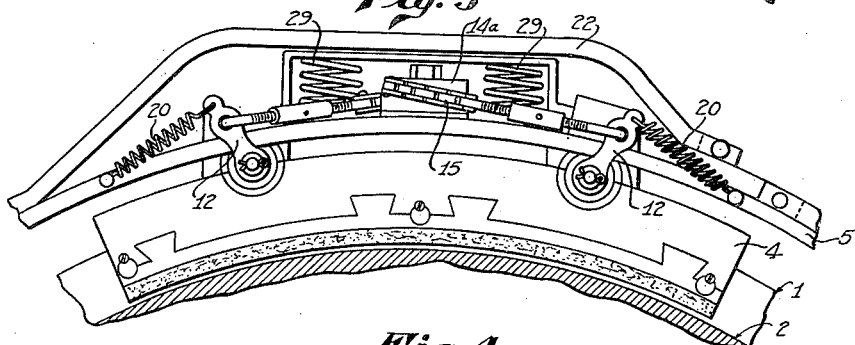
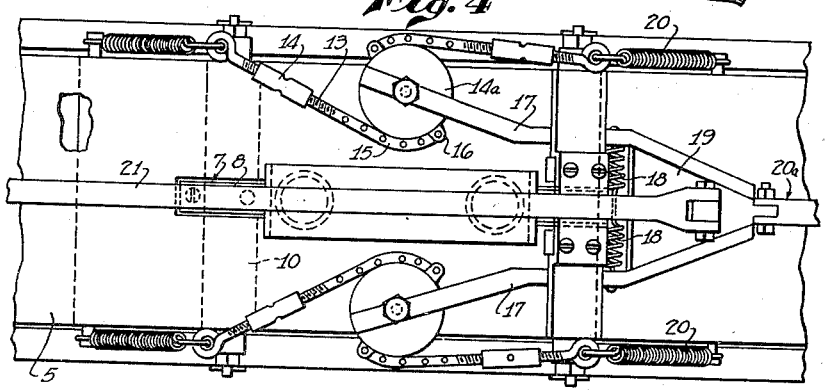
Inventor
Clarence F. Clements
By Lyon & Lyon
Attorneys Nov. 14, 1939.　　　C. F. CLEMENTS　　　2,179,543
DRUM BRAKE
Filed June 10, 1939　　　5 Sheets-Sheet 3

Inventor
Clarence F. Clements
By Lyon & Lyon
Attorneys

Nov. 14, 1939.  C. F. CLEMENTS  2,179,543
DRUM BRAKE
Filed June 10, 1939   5 Sheets-Sheet 4

Inventor
Clarence F. Clements
By Lyon & Lyon
Attorneys

Nov. 14, 1939.         C. F. CLEMENTS         2,179,543
                       DRUM BRAKE
              Filed June 10, 1939      5 Sheets-Sheet 5
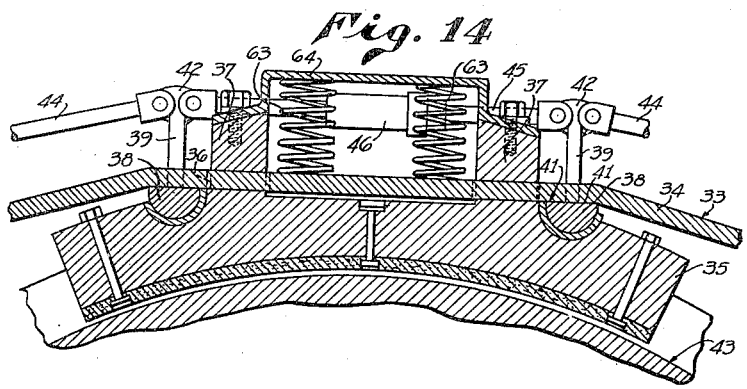
Fig. 14
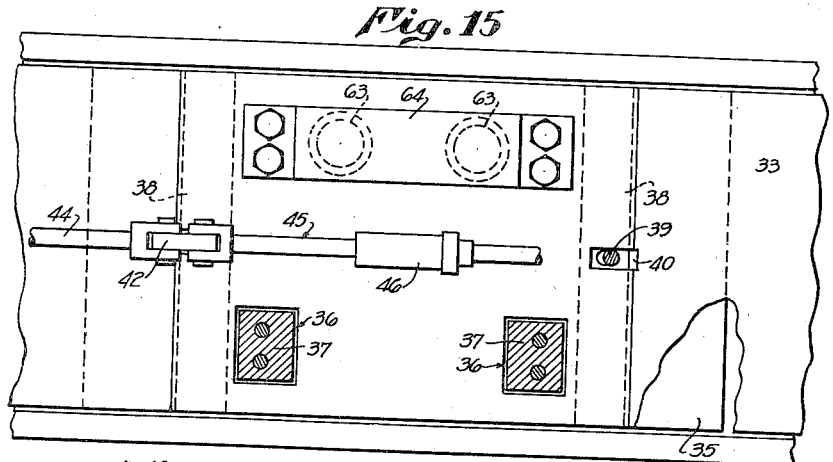
Fig. 15
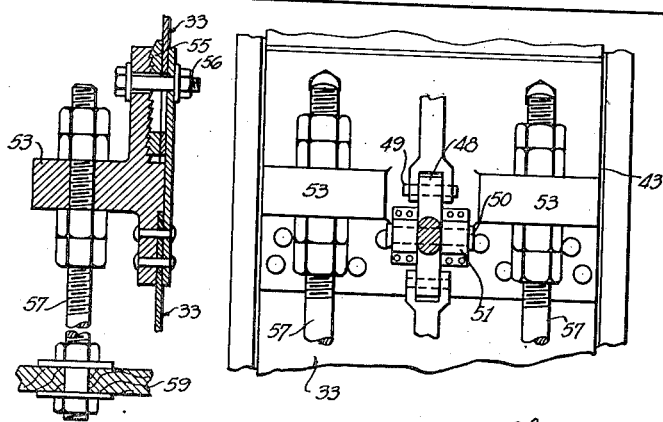
Fig. 17
Fig. 16
Inventor
Clarence F. Clements
By Lyon & Lyon
Attorneys Patented Nov. 14, 1939

2,179,543

UNITED STATES PATENT OFFICE 2,179,543

DRUM BRAKE

Clarence F. Clements, San Francisco, Calif., assignor of twenty per cent to Robert A. Garman and forty-five per cent to Wilbur R. Garman Application June 10, 1939, Serial No. 278,465

14 Claims. (Cl. 188—77)

This invention relates to brakes, and while features of the invention may be applied to brakes for various purposes, the invention is particularly applicable when employed in connection with the construction of brake mechanism for large drums, such as used in oil fields.

A common type of brake drum for drums of this type involves the use of a brake band, which extends around the drum, and the ends of this band have usually been attached to oppositely disposed arms of a rocker mounted to rotate about an axis, and capable of being rocked so as to pull the ends of the band together, thereby applying the brakes. With brake mechanism such as that, if the rotation of the drum is suddenly reversed, a considerable "kick" is delivered to the lever that tightens up the band, and accidents have been occasioned by reason of this.

An object of this invention is to produce a brake which will have the advantages of a brake band, and which will be capable of exerting a very powerful braking force on the drum, but which is so constructed that the "kick" effect due to a sudden reversal of the drum, will be negligible.

A further object of the invention is to construct the brake in such a way that the pressure of the brake shoes against the face of the drum is not developed merely by tension in the brake band itself, but having a construction in which, although the brake shoes are independently mounted, they can all be simultaneously forced in against the drum face.

A further object of the invention is to provide a brake mechanism of this type, with means for absorbing the drag of the drum on the brake shoes by relatively fixed means, or a member encircling the drum face, thereby reducing to a minimum the action of the drum on the brake, as regards the development of any "kick" in the brake applying mechanism.

A further object of the invention is to provide a brake mechanism of this type having a plurality of brake shoes spaced apart around the face of the drum, and having improved means for applying the same to the drum face so that all brake shoes can be applied simultaneously, and with substantially equal force.

In its preferred construction, the brake mechanism includes a relatively fixed means, such as a fixed band encircling the drum face, and provided with a plurality of inwardly movable brake shoes guided to move in and out on the encircling band; and one of the objects of the invention is to provide improved means associated with each brake shoe for moving the same inwardly, and to provide means associated with the actuating means, which will equalize the action of the different shoes.

Further objects of the invention will appear hereinafter.

The invention consists in the novel parts and combination of parts to be described hereinafter, all of which contribute to produce an efficient drum brake.

A preferred embodiment of the invention is described in the following specification, while the broad scope of the invention is pointed out in the appended claims.

In the drawings, Figs. 1 to 11 are the same as Figs. 1 to 11 of my prior application referred to above, and the remaining figures in the drawing disclose improvements in this invention.

Fig. 2 is a fragmentary view, and is a section upon an enlarged scale taken through one of the brake shoes, and showing a short portion of the brake drum at the drum face, and illustrating the means for mounting the brake shoes and for actuating the same. This section is, of course, taken in the plane in which the drum revolves.

Fig. 3 is a side elevation of the parts shown in Fig. 2, excepting a portion of the drum, which is illustrated as in Fig. 2.

Fig. 4 is a plan of the parts illustrated in Fig. 3.

Fig. 14 is a section similar to Fig. 2, but particularly illustrating the mounting of the brake shoes and actuating means for them, when constructed as illustrated in Fig. 12.

Fig. 15 is a plan in partial section of the parts shown in Fig. 14, certain parts being broken away.

Fig. 16 is a vertical section taken at the left anchorage for the relatively fixed means of the brake as ilustrated in Fig. 12, certain parts being broken away.

Fig. 17 is an elevation of the parts illustrated in Fig. 16, looking from the left side, and showing the handle of the operating lever in cross-section.

Figures 1, 5, 6, 11:
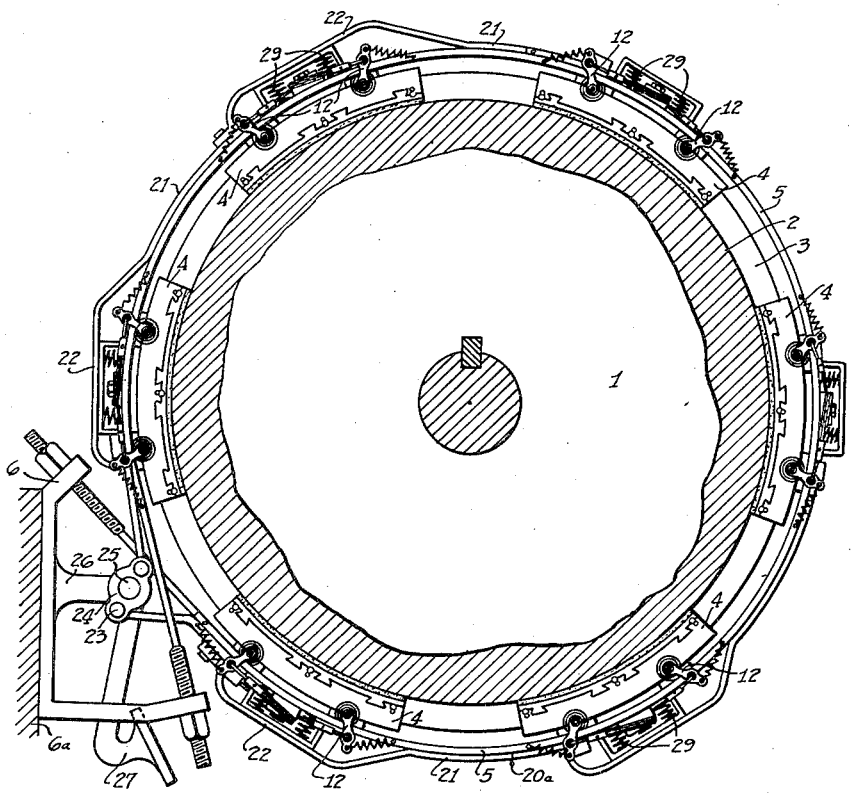
Fig. 1 is a side elevation of a brake mechanism embodying my invention, and illustrating the shaft of the drum in cross-section. This view shows a portion of the drum in elevation, and a portion of it in cross-section.
Fig. 5 is a side elevation upon an enlarged scale of one of the rocker pins, which I prefer to employ associated with the brake shoes for applying the same to a drum face.
Fig. 6 is an end elevation of the rocker pin illustrated in Fig. 5.
Fig. 11 is a diagrammatic view illustrating a modification of the brake applying mechanism illustrated in Figs. 9 and 10.
Figure 7:
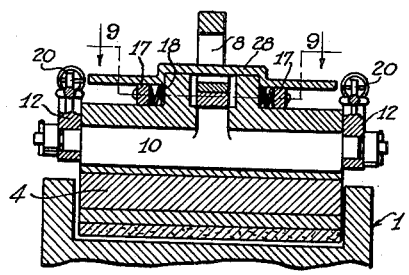
Fig. 7 is a section taken about on the line 7—7 of Fig. 2, and further illustrating details of the mounting of the rocker pins, and also showing a short portion of the rim of the drum.

Before proceeding to a more detailed description of the invention, it should be stated that in practicing the invention I provide relatively fixed means near the drum, and on this fixed means I mount a plurality of brake shoes, which are capable of moving in toward the drum or away from the drum. These brake shoes are preferably spaced equidistant around the drum, and associated with each brake shoe I provide actuating means preferably in the form of a rocker capable of rotating around an axis, so that when this actuating means or rocker is actuated, it will force the brake shoe inwardly against the drum. The brake shoes are mounted in such a way that frictional forces exerted by the drum on the shoes, are absorbed by the relatively fixed means, and the actuating means or rockers are so mounted that the reaction force of the brake shoes upon them has little tendency to rock the actuating means or rockers on their axes. In this way, any tendency of the brake to "kick back" upon a sudden reversal of the drum is substantially eliminated. At the same time, the brake mechanism affords means for applying braking force substantially equally distributed around the face of the drum, and the invention may involve the use of equalizing means for insuring that the pressure of the brake shoes on the drum is substantially equalized.

Referring more particularly to the parts, and especially to Figs. 1 to 11 inclusive, 1 indicates a brake drum of any common construction having a braking face 2 with side flanges 3 between which the shoes 4 of the brake lie. These shoes 4 are preferably spaced equidistant around the periphery of the drum, and they are mounted for in and out movement toward or from the drum, preferably as indicated in Fig. 2. In order to accomplish this, I prefer to provide relatively fixed means in the form of a band 5 that extends circumferentially around the drum a considerable distance from the drum face, and the ends of this fixed band may be anchored in any suitable manner as, for example, by securing the same in a bracket 6 secured to a frame member or post 6a (see Fig. 1).

Figure 9:
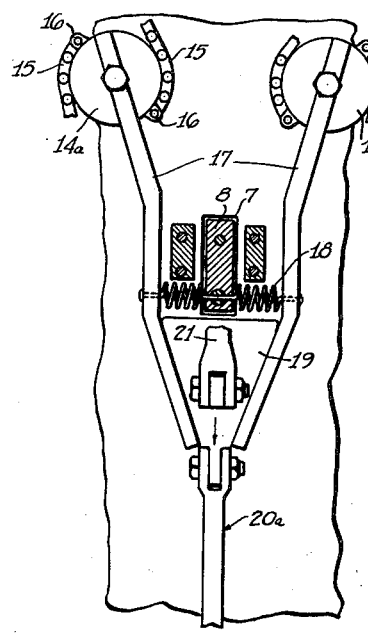
Fig. 9 is a developed plan view and section taken about on the line 9—9 of Fig. 7, and showing the parts of the brake applying mechanism in a position of rest.
Figure 10:
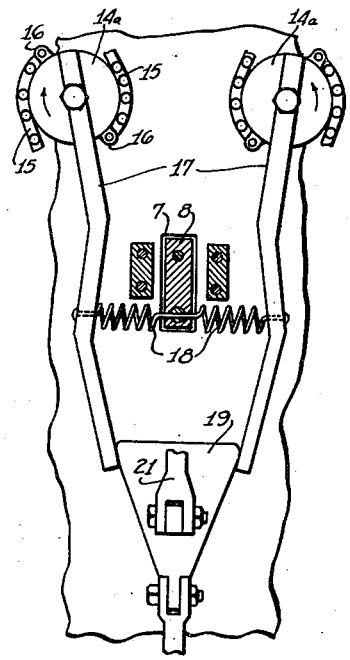
Fig. 10 is a view similar to Fig. 9, but showing the parts of the brake mechanism in the relation which they have when the brakes are applied.

This fixed band 5 is provided with means for guiding the brake shoes, and in the present instance, this is accomplished by providing a pair of openings 7 (see Fig. 2) of substantially rectangular form, through which rectangular posts 8 on the backs of the brake shoes extend outwardly. Mounted on the relatively fixed member or band 5, I provide rocker means associated with each brake shoe, and these rocker means are all connected together around the periphery of the drum so that they can all be actuated simultaneously. This rocker means preferably includes two rocker devices 9 (see Fig. 2), and the body of each rocker device is preferably in the form of a rocker pin 10 (see Fig. 5) with angular necks 11 at their ends to receive actuating means in the form of a lever 12 corresponding to each end of the pin. The levers 12 corresponding to each shoe are connected up together so that they are operated in unison. In the present instance, as illustrated in Fig. 2, the pins are actuated so that they rotate in opposite directions and through the medium of an equalizer device, which will equalize the action of the two pins. The action of this equalizing operating means will be more clearly understood from an inspection of Figs. 9 and 10, in connection with Fig. 4. Each lever 12 is connected by a link 13 including a turn buckle 14 with an equalizer pulley 14a through the medium of a short flexible cable or chain 15, the end of which is pivotally secured at 16 to the rim of the pulley. Each pulley is pivotally mounted on the relatively fixed band 5, and carries a lever 17, which is rigid with the pulley. These levers are pulled toward each other by a duplex spring 18, and the free ends of the levers are located on opposite sides of a spreader device or cam plate 19. By pulling this cam plate 19 in the direction of the arrow on Fig. 9, it will swing the levers 17 in opposite directions, and thereby produce rotations of the pulleys in the directions indicated, which will take up the chains 15 and pull on the links 13. If desired, each lever 12 may be provided with a light return spring 20 that rotates the rocking pin 10 on its axis to a position of rest when the cam plate 19 moves back into the position in which it is indicated in Fig. 9.

Suitable means is provided for actuating all of the spreaders 19 in unison. For this purpose I provide actuating means 20a formed of links 21 lying on the outer face of the fixed band 5, and formed with offset extensions 22 opposite the brake shoes, for a purpose which will appear hereinafter. The ends of this actuating means or band 20 are connected by pins 23 to a rocker 24 (see Fig. 1), supported on a shaft 25 carried on a fixed bracket 26, said shaft being rotatable at will by a treadle lever 27, or by a hand lever. The spreaders 19 are located on the under side of the drum face in the same direction as the spreaders 19 on the upper side of the drum; that is to say, the small ends of the spreaders, which are of substantially triangular form, are located toward the short lever, or rocker 24. With this organization of parts, it will be evident that if the rocker shaft 25, as illustrated in Fig. 1, is given a slight rotation in a clockwise direction by a pedal 27, the spreaders 19 will operate all around the drum to cause the brake shoes 4 to move inwardly.

In Fig. 11, which is a diagrammatic view, I illustrate how these spreaders 19 are arranged with relation to each other.

I provide means for individually releasing the brake shoes 4, and for this purpose I may provide each brake shoe with an offset strap 28 attached to the ends of the posts 8, and under this strap a pair of coil springs 29 may be provided, seating on the outer face of the band 5 and thrusting outwardly against the inner side of the strap. It will be evident that these springs will hold the brake shoes released when the brakes are not applied.

In order that rotation of the pins 10 will move the brakes inwardly, these pins are set on their inner faces in sockets, grooves, or bearings 30 (see Fig. 2), which have bushings 31 as shown. The outer side of each rocker pin is cut away to form a flat face (see Fig. 6), with shoulders 32 on each side of the radial line through the pin from the center of the drum. These shoulders 32 lie against the inner face of the relatively fixed band 5 and operate as rocker toes when the pins are rotated to move the pin bodies inwardly toward the axis of the drum. This action will be readily understood from an inspection of Fig. 8, understanding, however, that Fig. 8 also illustrates a slight modification of the posts passing through the fixed band 5.

Figure 8:
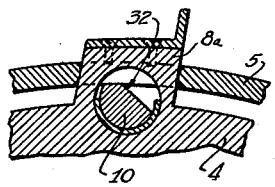
Fig. 8 is a fragmentary section taken in the plane of rotation of the drum, and illustrating a modified construction for mounting the brake shoes in the relatively fixed member or band that encircles the brake drum.

Referring to Fig. 8, this modification consists in forming the post 8a so that it inclines somewhat to the radial line passing through the pin from the center of the drum. If an inclined post of this kind is employed, it will have a tendency under the action of the drag on the shoes, either to pull the shoes in tighter on the drum, or move them out slightly toward the releasing position. This will depend on the direction of rotation with respect to the inclination of the posts. Posts of this type are intended particularly for use on a drum having only one direction of rotation.

Referring now particularly to Figs. 12 to 18 inclusive, I shall now describe the preferred embodiment of the invention. In this embodiment of the invention the relatively fixed means for carrying the brake shoes may be in the form of a band 33 of polygonal form; that is to say, it is bent so as to form a plurality of relatively straight sections 34, and on alternate sections I mount the brake shoes 35. For this purpose I prefer to form each section or extension 34 that carries a brake shoe with four openings 35 (see Fig. 15), and I form the brake shoe 35 with four posts 37 that extend up through these openings. In this way the space between the posts in the central plane of the brake mechanism is left clear for the actuating mechanism that moves the brake shoes inwardly. Although I prefer to employ openings such as the openings 36, it is obvious that, if desired, the posts 37 could be formed so that they could be received in notches formed in the edges of the band.

The actuating means for each brake shoe preferably comprises two rocking pins 38, each rocking pin having a lever 39 that extends outwardly through a corresponding slot 40 in the fixed band 33. The pins 38 are cut away on their outer sides to form two shoulders 41 (see Fig. 14), which engage the inner face of the fixed band 34. Each pin has an actuating lever 42, and these levers are connected up by actuating means so that they can be actuated in unison to rotate the pins and force the brake shoes 35 inwardly against the drum face 43. For this purpose I connect these levers in pairs by means of long links 44 that connect each shoe with an adjacent shoe, and short links 45 that connect the levers corresponding to each shoe.

Figure 18:
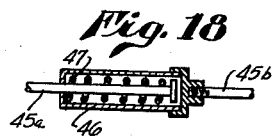
Fig. 18 is a longitudinal section through a flexible connection, which I prefer to employ for connecting up the actuating mechanisms for the different brake shoes to insure equalization of the work of the brakes between the different shoes.

In order to equalize the operation of the shoes, that is to say, to equalize the force that they exert on the drum, I prefer to provide the links 44 and 45 with yielding or flexible connections 46, one of which is illustrated in detail in Fig. 18, involving the use of a coil spring 47, which is not in compression when the brakes are in their releasing position, but which will be compressed upon a slight movement of the link members 45a and 45b, which are connected at these flexible joints. It should be understood, however, that these flexible connections are not essential, and if desired, plain links may be provided with turn buckles for adjusting the length.

Figure 12:
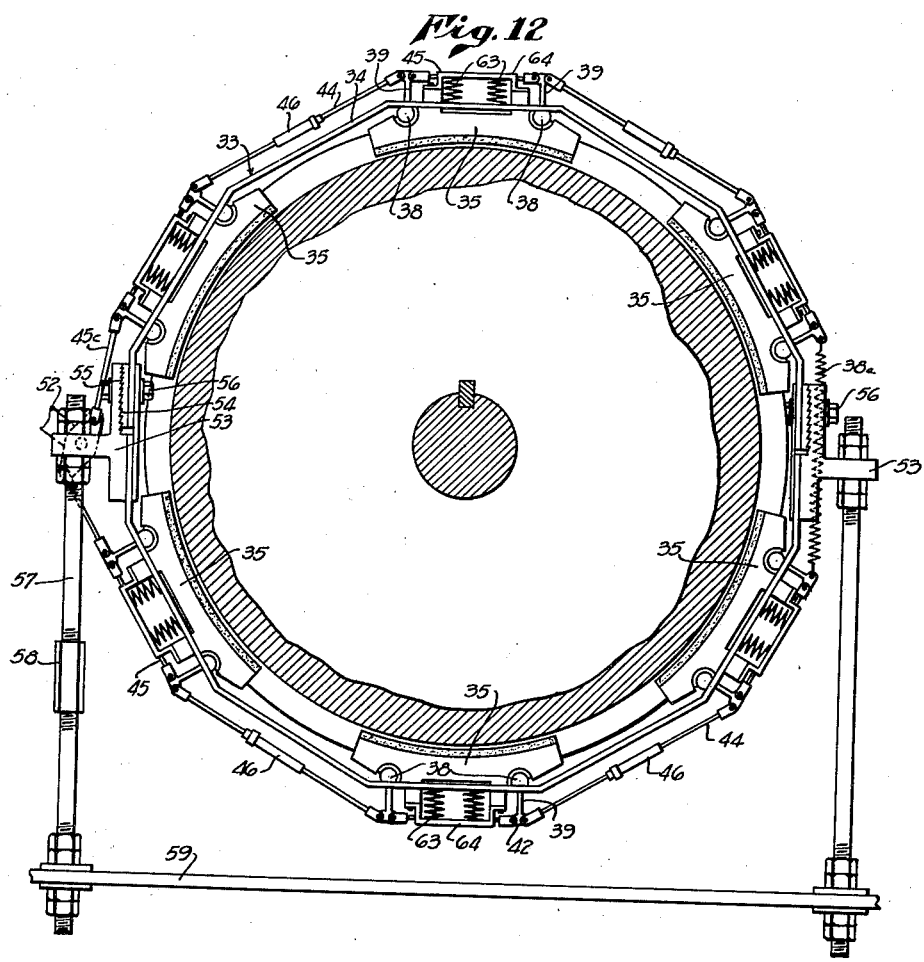
Fig. 12 is a view similar to Fig. 1, but illustrating another embodiment of the invention that simplifies the actuating means for moving all of the shoe actuating devices in unison.

At one side of the drum, for example, at the left side as illustrated in Fig. 12, end links 45c are provided, which connect to a rocker 48 (see Fig. 17) by pivot pins 49, said rocker being mounted on a shaft 50 mounted in bearings 51 and capable of being moved at will by a lever 52 rigid with the rocker or take-up head 48. At the right side of the drum the rocker levers of the adjacent brake shoes are connected by a coil spring 38a. This spring normally holds the brake actuating means in its released position, and permits all the levers 42 to be swung to the left when the brakes are being applied.

The band 33 is preferably made in two sections including an upper section and a lower section, and these sections are connected together by a bracket or casting 53 presenting a ribbed face 54 against which a ribbed plate 55 can be clamped by means of a clamping bolt 56, which plates 55 are carried on the ends of the upper section of the band 33; and it will be evident that by loosening up these bolts 56, the sections of the band can be moved further apart or nearer together, as desired.

The brackets 53 may be anchored on posts or stanchions 57, including turn buckles 58 for adjusting their height, the lower ends of the stanchions being secured in a base or anchor plate 59.

Figure 13:
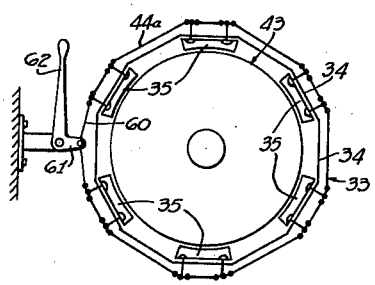
Fig. 13 is a diagrammatic view illustrating an actuating mechanism in which the ends of the actuating member are not drawn together, but in which the actuating means is shifted circumferentially in one direction or the other with respect to the drum face.

If desired, the actuating mechanism for the shoes can be connected up so that all of the levers of the rocking pins would be swung in the same direction on their axes. This is illustrated in Fig. 13, in which the construction would be the same as that illustrated in Fig. 12, except that the ends of the actuating means 44a would involve the use of special links 60 connected to a short arm or lever 61, which can be operated by a hand lever 62. With this arrangement it will be evident that by shifting the lever 62 in either direction, the actuating means 44a can be shifted in a circumferential direction with respect to the drum face, and such a movement will cause all the levers 44a to rock in the same direction, and force their shoes inwardly.

The brake shoes 35 have releasing springs 63 similar to the releasing springs 29 and mounted in the same way to press outwardly against straps 64 connecting the posts.

In the operation of the brake mechanism, when constructed as illustrated in Figs. 1 to 11, the movement of the brake pedal 27 in a direction to apply the brake, that is to say, by movement toward the left as viewed in Fig. 1, the ends of the actuating band 20 are pulled toward each other, thereby causing the spreader plates or wedges 19 to swing the levers 17 outwardly at their free ends, and this rotates the equalizer pulleys 14a, which take up the chains 15 and exert tension in the links 13, thereby pulling the levers 12 corresponding to each brake shoe, toward each other. This rocks the pins 10 on their shoulders 32, thrusting against the inner face of the relatively fixed band 5. This will force the brake shoes inwardly against the drum face. In forcing the brake shoes inwardly in this way, the straps 28 over the springs 29 will compress these springs, and hence when the pressure on the brake pedal 27 is relieved, the springs 29 will return the brake shoes to a position of rest out of contact with the face of the drum. This return movement of the brake shoes will be permitted by reason of the fact that the coil springs 20 will restore the levers 12 to their normal position of rest after the brake pedal has been released.

In the embodiment of the invention illustrated in Fig. 12, when the lever 52 is swung upwardly the links 45c will be pulled toward each other, thereby exerting tension in all of the links 44, thereby swinging the levers 42 on the upper side of the drum toward the left, and simultaneously swinging the levers 42 on the under side of the drum toward the left. This will rotate all of the rocking pins 38, causing them to press the brake shoes 35 in against the face of the drum. Spring 38a will retract after the brakes are released at rocker 48, thereby restoring the levers 42 to their normal position so as to permit the spring 63 to push the brake shoes 35 outwardly, and restore them to their releasing position.

The yielding connections in the links 44, and illustrated in detail in Fig. 18, insure that all of the brake shoes will move in against the drum face and exert a substantially equal pressure upon it.

It is understood that the embodiment of the invention described herein is only one of the many embodiments this invention may take, and I do not wish to be limited in the practice of the invention, nor in the claims, to the particular embodiment set forth.

What I claim is:

1. In a brake mechanism, the combination of a drum, relatively fixed means adjacent the drum, a plurality of spaced brake shoes separate from the fixed means adjacent the drum face, and movable inwardly on the relatively fixed means, rocker means mounted to rock on an axis fixed on each brake shoe, for moving the shoes against the drum face, actuating means connected with the rocker means for rotating the same on their axes and extending in a circumferential direction on the drum beyond the drum face, and means for moving said actuating means to apply all the shoes simultaneously to the drum face.

2. In a brake mechanism, the combination of a drum, relatively fixed means adjacent the drum, a plurality of spaced brake shoes separate from the fixed means adjacent the drum face, and movable inwardly on the relatively fixed means, rocker means mounted to rock on an axis at each brake shoe for moving the shoes against the drum face, actuating means connected with the rocker means for rotating the same on their axes and extending circumferentially around the drum beyond the drum face, said actuating means mounted so that it is capable of shifting circumferentially around the drum face in either direction for applying all of the shoes simultaneously to the drum face, and means for shifting the actuating means in either direction.

3. In a brake mechanism, the combination of a drum, a relatively fixed band extending circumferentially around the drum adjacent the drum face, a plurality of spaced brake shoes mounted on the said fixed band so that they are movable in a substantially radial direction toward the drum face, rocker means associated with each shoe and supported on the relatively fixed band actuating means connected with the rocker means and extending circumferentially around the drum beyond the drum face, and means for moving said actuating means to apply all the shoes simultaneously to the drum face.

4. In a brake mechanism, the combination of a drum, a relatively fixed band extending circumferentially around the drum adjacent the drum face, a plurality of spaced brake shoes mounted on the said fixed band so that they are movable in a substantially radial direction toward the drum face, rocker means associated with each shoe and supported on the relatively fixed means, actuating means connected with the rocker means and extending circumferentially around the drum beyond the drum face, means for moving said actuating means to apply all the shoes simultaneously to the drum face, and resilient means associated with each brake shoe for withdrawing the brake shoes from the drum when the actuating means is in a position of rest.

5. In a brake mechanism, the combination of a drum, relatively fixed means extending circumferentially around the drum and adjacent the drum face, a plurality of spaced brake shoes adjacent the drum face and supported on the relatively fixed means to move toward or from the drum face, rocker means mounted to rock on an axis and corresponding to each brake shoe for moving the shoes against the drum face, actuating means extending circumferentially around the drum, a yielding connection between the actuating means and the rocker means, and means for moving said actuating means to apply all the shoes simultaneously to the drum face.

6. In a brake mechanism, the combination of a drum, a relatively fixed band extending circumferentially around the drum face, a plurality of spaced brake shoes adjacent the drum face and supported on the relatively fixed band for movement toward or from the drum face, rocker means corresponding to each shoe engaging the shoe at the inner side of the rocker means and engaging the inner side of the relatively fixed band at the outer side of the rocker means, actuating means connected with the rocker means and extending circumferentially around the drum beyond the said relatively fixed band, and means for moving said actuating means to rock the rocker means so as to apply all the shoes simultaneously to the drum face.

7. In a brake mechanism, the combination of a drum, a relatively fixed band extending circumferentially around the drum face, a plurality of spaced brake shoes adjacent the drum face and supported on the relatively fixed band for movement toward or from the drum face, rocker means corresponding to each shoe, each rocker means comprising a lever projecting outwardly in a general radial direction and having a pin with shoulders engaging the inner face of the relatively fixed band; the under sides of said pins engaging the brake shoes to force the same inwardly, actuating means connected with the said levers and extending circumferentially around the drum beyond the said relatively fixed band, and means for moving said actuating means to rock the rocker means so as to apply all the shoes simultaneously to the drum face.

8. In a brake mechanism, the combination of a drum, a relatively fixed band extending circumferentially around the drum beyond the drum face and having guide openings therein, a plurality of spaced brake shoes guided in the said openings to move toward or from the drum face. rocker means corresponding to the brake shoes and mounted to rock on an axis extending substantially parallel to the axis of the drum, each of said rocker means having a pin for engaging its corresponding shoe and having a shoulder for engaging the inner side of the relatively fixed band, said shoulders operating when the rocker means is actuated, to force the brake shoes inwardly against the drum face, actuating means connected with the rocker means and extending circumferentially around the drum beyond the drum face, and means for moving said actuating means in a circumferential direction to apply all the shoes simultaneously to the drum face.

9. In a brake mechanism, the combination of a drum, a relatively fixed band extending circumferentially around the drum beyond the drum face, a plurality of spaced brake shoes carried by the relatively fixed band and guided to move toward or from the drum face, rocker means corresponding to the brake shoes and mounted to rock on an axis extending substantially parallel to the axis of the drum, each of said rocker means having a pin for engaging its corresponding shoe and having a rocking toe for engagement at the inner side of the relatively fixed band, said toes operating when the rocker means is actuated to force the brake shoes inwardly against the drum face, and actuating means connected with the rocker means and extending circumferentially around the drum beyond the drum face.

10. In a brake mechanism, the combination of a drum, a relatively fixed band of polygonal form surrounding the brake drum and having a plurality of substantially straight extensions, said straight extensions having guide openings therethrough, brake shoes corresponding to the said straight extensions and having means guided in the said openings to enable the shoes to move toward or from the drum face, rocker means corresponding to each shoe including a rocker body, and a lever projecting therefrom, said rocker body cooperating with the relatively fixed band and a brake shoe so that when the rocker levers are moved in a circumferential direction the rocker bodies will force the shoes against the brake band, actuating means comprising a plurality of links extending circumferentially around the relatively fixed band on its outer side and connecting the levers of the rocker means, and means for moving the said actuating means to swing the rocker levers and apply the brake shoes.

11. In a brake mechanism, the combination of a drum, a relatively fixed band extending circumferentially around the drum and adjacent the drum face, a plurality of spaced brake shoes adjacent the drum face and supported on the relatively fixed band to move toward or from the drum face, a pair of rocker pins corresponding to each brake shoe carried by the relatively fixed band and capable when rocked of moving the brake shoes inwardly, equalizer means connecting the rocker pins for actuating the same in unison, and means for actuating all of the equalizer means so as to apply all of the brake shoes simultaneously to the drum face.

12. In a brake mechanism, the combination of a drum, relatively fixed means adjacent the drum, a plurality of spaced brake shoes separate from the fixed means, located adjacent the drum face, and individually supported on the relatively fixed means for movement against the drum, rocker means mounted to rock on an axis at each brake shoe for moving the shoes against the drum face, actuating means including freely movable links pivotally attached at their ends to each rocker means for rocking the same on its axis, and extending in a circumferential direction along the drum face, and means for moving said actuating means to apply all the shoes simultaneously to the drum face.

13. In a brake mechanism, the combination of a drum, relatively fixed means adjacent the drum, a plurality of spaced brake shoes separate from the fixed means, located adjacent the drum face, and individually supported on the relatively fixed means for movement against the drum, rocker means mounted to rock on an axis at each brake shoe for moving the shoes against the drum face, actuating means pivotally attached to each rocker means for rocking the same on its axis, and extending circumferentially along the drum face, said actuating means mounted so that it is capable of shifting circumferentially around the drum face in either direction for applying all of the shoes simultaneously to the drum face, and means for shifting the actuating means in either direction.

14. In a brake mechanism, the combination of a drum, relatively fixed means adjacent the drum, a plurality of spaced brake shoes separate from the fixed means adjacent the drum face, having pin-sockets, and guided to move inwardly on the relatively fixed means, rocker-means mounted to rock on an axis on each brake shoe, said rocker-means including pins to rotate respectively in said pin-sockets, said pins having cam faces at their ends beyond the edges of the brake shoes for engaging the relatively fixed means, operating when the pins rock to press the pins against the shoes, and thereby force the shoes against the drum face, actuating means connected with the rocker-means for rotating the same on the axes of said pins, said actuating means extending in a circumferential direction on the drum beyond the drum face, and means for moving said actuating means to apply all the shoes simultaneously to the drum face.

CLARENCE F. CLEMENTS.